March 6, 1956 C. C. WAUGH 2,737,049
TORQUEMETER
Filed Feb. 3, 1954 2 Sheets-Sheet 1

INVENTOR
Charles C. Waugh
BY
*Philip Subkow*
ATTORNEY.

March 6, 1956   C. C. WAUGH   2,737,049
TORQUEMETER
Filed Feb. 3, 1954   2 Sheets-Sheet 2
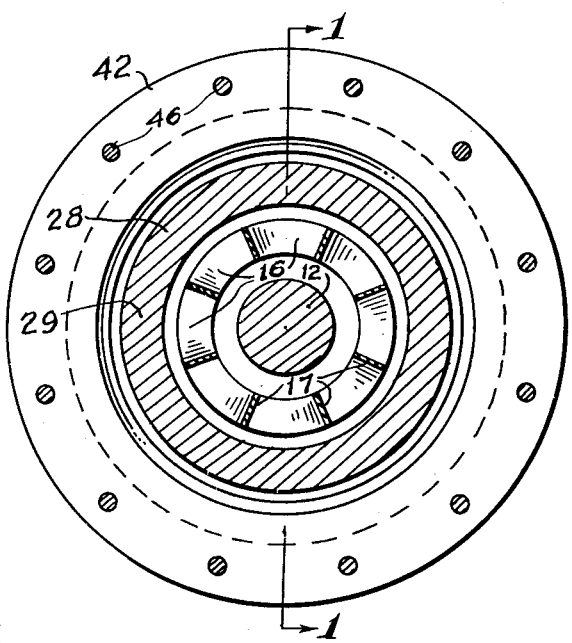
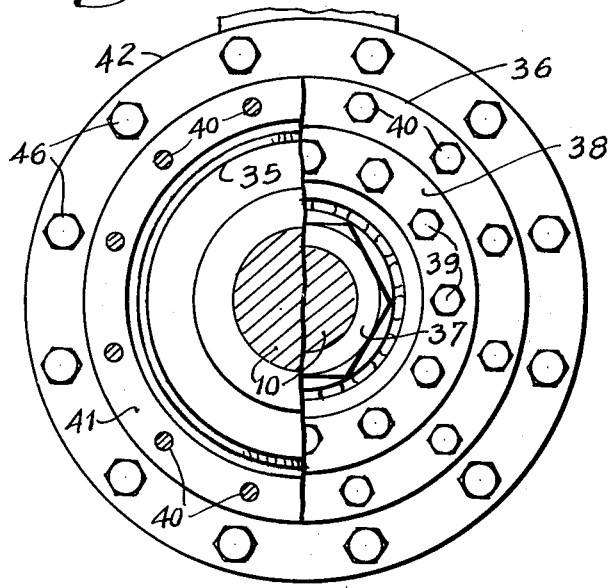
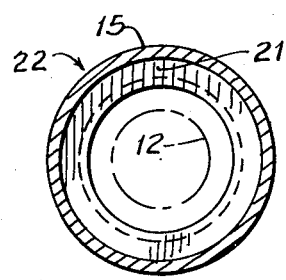
INVENTOR
Charles C. Waugh
BY
ATTORNEY.

United States Patent Office 2,737,049
Patented Mar. 6, 1956

2,737,049

TORQUEMETER

Charles C. Waugh, Tarzana, Calif.

Application February 3, 1954, Serial No. 407,829

5 Claims. (Cl. 73—136)

This invention relates to a new and improved device for measuring the torsional moment in a rotating shaft or in a shaft to which a torque is applied.

My invention may be used principally as a torquemeter to measure the torque development by rotating machinery such as gasoline engines, diesel engines, steam turbines, electric motors or gas turbines, and to measure the torque used to drive machines such as compressors, pumps or propellers.

It is an object of this invention to provide a torque measuring device which is simple, is composed of a minimum of component parts, is compact in size and is of rugged construction.

Another object is the provision of a torquemeter which will operate efficiently and dependably to measure a static or dynamic torque or torque at any speed or with the shaft stationary.

Other objects and advantages of the invention will be apparent from the following description of a preferred embodiment of my invention taken in connection with the accompanying drawings wherein:

Fig. 4 is a vertical section taken on line 4—4 of Fig. 1;

Fig. 5 is a broken sectional view taken on line 5—5 of Fig. 1;

Fig. 6 is a section taken on line 6—6 of Fig. 3; and

Figure 1:
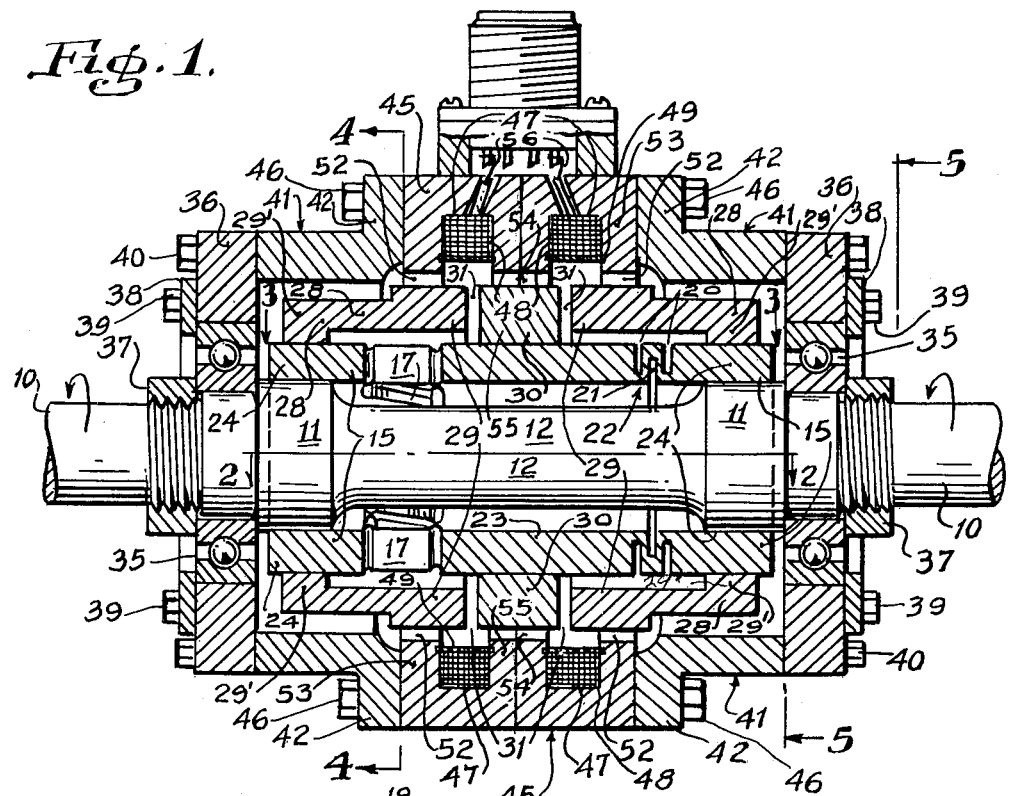
Fig. 1 is a vertical section of the device according to the invention on line 1—1 of Fig. 4, certain parts being shown in full for clarity.

Referring to the drawing, the torquemeter of the invention comprises a rotatable shaft 10 having a pair of spaced apart flanges 11 and an intermediate neck portion 12 of smaller diameter between the flanges. Friction fitted axially to flanges 11 for rotation with the shaft is a sleeve 15, the midportion 23 of which is spaced from and disposed about the neck portion 12 of shaft 10.

The sleeve 15 is constructed of non-magnetic material, such as non-magnetic stainless steel, bronze, brass or aluminum.

Figure 2:
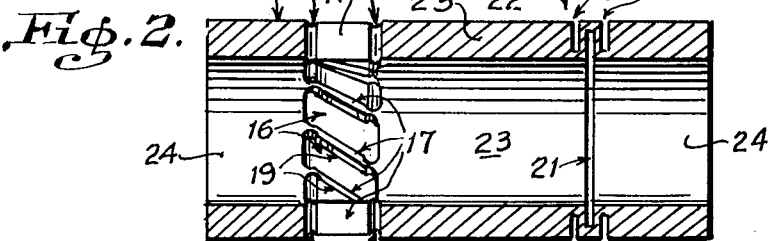
Fig. 2 is a horizontal section taken on line 2—2 of Fig. 1 with the shaft removed.
Figure 3:
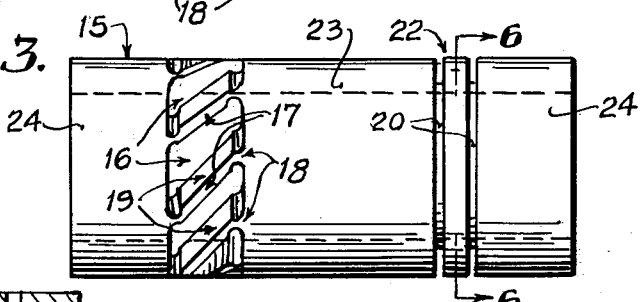
Fig. 3 is a plan view of the sleeve or armature actuator of the device taken on line 3—3 of Fig .1.

As seen in Figs. 2 and 3, sleeve 15 is cut away at one end thereof to form a plurality of adjacent circumferentially spaced slots 16 about the periphery of the cylindrical sleeve, the slots being disposed at an angle of about 45 degrees with the axis of said sleeve. These slots provide an equal number of relatively thin webs 17, each of which separates a pair of slots 16, the webs also being normally disposed at a 45-degree angle to the sleeve axis about the periphery of the sleeve. The webs are necked down at their opposite ends 18 to enable them to be more readily flexed at these portions for a purpose hereinafter pointed out, the intermediate portion 19 of each of these webs being relatively stiff in bending compared to the necked portions so that bending occurs substantially entirely at the necked in portions 18 which thus act as hinge points. However, the intermediate and necked portions permit twist of the web to permit the angular displacements referred to herein. In the embodiment shown, there are eight slots and an equal number of webs (see Fig. 4) formed near one end of sleeve or armature actuator 15. Near the other end of the sleeve in the outer surface thereof are formed a pair of adjacent parallel grooves 20 circumferentially disposed about the entire periphery of sleeve 15. The plane of these grooves is normal to the axis of the sleeve 15. A third groove 21 is formed circumferentially about the inner wall of the sleeve midway between and parallel to the grooves 20. This provides a flexible joint in the form of a bellows type structure 22 permitting a small amount of axial flexibility or permitting axial displacement of the midportion 23 of the sleeve 15 relative to its axially fixed end portions 24.

It will be observed from the foregoing structure of sleeve 15 that as the shaft 10 twists due to a torque applied to the shaft, a torsional moment is applied to the sleeve 15 at the end porions 24 through the neck portions 18, the webs 17 on the sleeve tending to flex a slight amount. Due to the flexible joint 22 near the other end of the sleeve, when webs 17 are thus flexed, midportion 23 of sleeve 15 moves axially a short distance relative to the stationary end portions 24 of the sleeve depending on the direction of rotation of the shaft 15. Due principally to the structure of spring webs 17, for small angles of twist up to one or two degrees, the axial motion of sleeve midportion 23 approximates a linear function of the angular twist.

Friction fitted to the opposite outer cylindrical ends 24 of sleeve 15 by a press fit are a pair of cylindrical pole pieces 28, each of which has an inwardly extending portion 29 disposed parallel to the axis of sleeve 15 and spaced a short distance from the outer surface of the sleeve by reason of the internal flange 29' permitting the free axial movement of the midportion 23 which is thus out of frictional contact with the pole pieces. The inner ends of the pole portions 29 are spaced from each other and are located adjacent the midportion 23 of sleeve 15. A cylindrical armature 30 is also friction fitted by a press fit to the outer surface of midportion 23 of sleeve 15 in the space between the inner ends of the pole portions 29 at approximately the center of the device, leaving a small circumferential space or air gap 31 between each of the inner ends of such pole portions 29 and the adjacent faces of armature 30.

Pole pieces 28 and armature 30 are constructed of a material having relatively high magnetic permeability and low hysteresis such as soft iron or other suitable material of like magnetic properties, and the pole pieces and armature 30 rotate with sleeve 15 and shaft 10. It will be seen that when the shaft 10 is subjected to a torsional moment, whether or not the shaft rotates, pole pieces 28 remain axially fixed on the end portions 24 of sleeve 15 while the armature moves axially with the sleeve midportion 23 in response to axial motion of the latter as described above. This axial movement of the armature 30 relative to the inner ends of pole portions 29 changes the length of the respective air gaps 31. Preferably in order to maintain linearity of response the change in the length of each of the air gaps should be a small fraction, for example, up to about 1/3 of the length of the gaps and preferably the movement should not be sufficiently great to cause the armature to make physical contact with the inner ends of pole portions 29.

Shaft 10 is mounted for rotation in bearings 35 disposed adjacent the outer ends of the shaft flanges 11 in bearing holders 36, the shaft being held against axial movement and the bearings maintained in position by means of bearing nuts 37 threadably engaging shaft 10 and screwed into contact with the outer side of each of the bearings. A bearing retainer plate 38 is fastened by bolts 39 to the outer face of each of bearing holders 36. Attached by bolts 40 to the inner faces of bearing holders 36 are a pair of laterally extending frame members 41, each having at its inner end a flange 42 positioned normal to and extending outwardly from the axis of shaft 10. The frame members are spaced from pole pieces 28 to permit relative rotational movement therebetween.

A cylindrical E core 45 having a pair of parallel annular recesses 47 is positioned between flanges 42 and is secured thereto by means of bolts 46. Disposed in the two annular recesses 47 of the E core is a pair of inductance coils 48 held in place by snap rings 49. The E core 45 surrounds armature 30 and the inner end portions of pole pieces 28, the inner ends of the E core being spaced from the armature and the end portions of the pole pieces to allow relative rotation between the core and the armature and pole pieces. This structure defines a pair of air gaps 52 between each of the outer arms 53 of the E core and the adjacent pole portion 29 of the pole pieces, and an air gap 54 between the center arm 55 of the E core and armature 30. The E core is formed from a material similar to the pole pieces 28 and armature 30. The two inductance coils 48 are each connected by means of leads 56 and 57 into any device responsive to or suitable for measuring the relative change in the inductance of the coils 48 as a result of the functioning of the device as explained herein, e. g., a conventional A. C. bridge circuit (not shown) to provide an indication of the torque applied to shaft 10.

Current in the inductance coils 48 sets up flux paths through the outer arm 53 of the E core 45, crossing auxiliary air gaps 52 to the two pole piece 28, traversing the measuring air gaps 31 to the armature 30, and then returning across the center auxiliary air gap 54 to the center arm 55 of the E core. The radial spacing of the two auxiliary air gaps 52 and the auxiliary air gap 54 from the ends of the arms 53 and 55 remain essentially constant at all times while the measuring air gaps 31 will change in length if the armature is moved in an axial direction, as previously described, one gap increasing in length while the other is decreasing. Due to the non-magnetic character of sleeve 15, the flux paths are localized to pass across gaps 31 and no leakage occurs through the sleeve. If the measuring gaps 31 are initially equal in length and the inductances of the two coils 48 are equal, the bridge circuit will be balanced although such balance could be obtained by an arbitrary choice of the relative length of these gaps when no twist is imposed or any arbitrary choice of the relative initial inductances of the coils. As the armature 30 moves axially to reduce the length of one of the gaps 31 and increase that of the other gap 31, one inductance decreases in value while the other increases, unbalancing the bridge. Indication of the degree of unbalance may be obtained by the use of any one of a number of commercial indicators or recording instruments designed for use with A. C. bridge circuits if such bridge is employed.

In operation shaft 10 of the invention device is coupled to the rotating machinery, the torque of which is to be measured. Assuming that a clockwise torsional moment is applied to shaft 10 as viewed from the right end of Fig. 1, a proportional angular twist occurs in the neck portion 12 thereof between the points at which the sleeve 15 is attached to the shaft flanges 11. This angular motion causes neck portions 18 of the webs 17 of the sleeve to flex so that the upper ends of the webs as seen in Fig. 3 move closer to the adjacent end portion 24 of sleeve 15 with the webs now disposed at an angle greater than 45 degrees with the axis of the sleeve. This causes axial movement of the midportion 23 of the sleeve, by means of the flexible joint 22, to the left as viewed in Fig. 3, the sleeve structure thus converting angular twisting of the shaft into an axial or rectilinear motion which is transmitted to armature 30, the axial motion of the armature thus being proportional to the torque.

As armature 30 is accordingly displaced to the left, as seen in Fig. 1, the length of the left air gap 31 decreases while the length of the right air gap 31 increases. This decreases the reluctance of left gap and correspondingly increases the inductance of the left coil 48 while increasing the reluctance of the right gap and decreasing the inductance of the right coil 48. The resulting unbalance of the bridge is proportional to the difference in length between the respective air gaps 31 and to the axial displacement of armature 30 and midportion 23 of sleeve 15; and hence such unbalance is also proportional to the torque developed in shaft 10 and provides a measure of such torque.

If shaft 10 is subjected to a force producing a counterclockwise torsional moment in the shaft as viewed from the right in Fig. 1, the torque or twist so developed in the necked down portion 12 of the shaft causes the webs 17 to flex so that the upper ends of the webs as seen in Fig. 3 move farther away from the adjacent end portion 24 of sleeve 15 with the webs now disposed at an angle less than 45 degrees with the axis of the sleeve. This causes axial movement of the midportion 23 of the sleeve to the right as viewed in Fig. 3 with a corresponding axial motion of armature 30 in the same direction. In this manner the length of the right gap 31 decreases while the length of the left gap 31 increases, producing an increase in inductance of the right coil 48 and a decrease in inductance of the left coil 48. This unbalances the bridge and the measure of such unbalance corresponding to the torque developed in shaft 10, as previously explained, is indicated.

Because the adjacent faces of the arms 55 and 53 and the armature 30 and the pole portions 29 are parallel and concentric, any axial displacement of the shaft 10 has no material effect on the reluctance of the several gaps 52 and 54 and produces no substantial relative change in the inductances of the coils. Consequently, no substantial error is introduced into the measurement by such displacement. Since as a practical matter the axial motion of the shaft under rotational load, where an end thrust is present, cannot be eliminated by use of conventional bearings, the above construction eliminates any substantial error which may be introduced by said axial motion.

Figure 7:
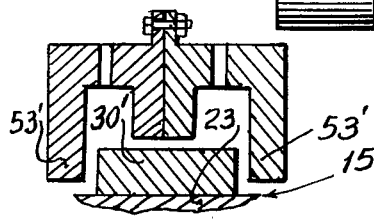
Fig. 7 is a fragmentary section of a modification of a feature of the device of Fig. 1.

In such cases where the end play of the shaft is small or may regulated, the pole pieces 28 may be omitted and the outer arms 53 of the E core may be extended in length as shown in 53' in Fig. 7 so that they are positioned opposite the ends of the armature, which is shown as 30' in Fig. 7. In all other respects the structure of Fig. 7 is the same as described above.

From the foregoing, it is seen that the invention provides an improved torquemeter of comparatively simple structure and of compact size. My device will operate efficiently from zero or a very low rotational speed to a very high speed. It is accordingly understood that my device may be used for measuring the torque applied to a shaft where the shaft is not rotating as well as in the case of a rotating shaft. An additional advantage of the invention device is that no slip rings, ordinarily used in torquemeters presently employed, are required. Further, there are no electrical windings on the rotating portion of my device, all electrical windings being on the stator or stationary portion of such device. Finally, the torquemeter of the invention is ruggedly constructed and is durable.

While I have described a particular embodiment of my invention for the purpose of illustration, it should be understood that various modifications and adaptations thereof may be made within the spirit of the invention as set forth in the appended claims.

I claim:

1. A torquemeter which comprises, a rotatable shaft, a sleeve axially connected at both ends to the outer periphery of said shaft for rotation therewith, an intermediate portion of said sleeve being spaced from and axially movable with respect to said shaft, a first flexible means connecting said intermediate portion with one end portion of said sleeve for urging said intermediate sleeve portion to move axially when said shaft is twisted due to a torque applied thereto, so as to convert the angular displacement of said shaft resulting from said torque into a rectilinear displacement of said last-named sleeve portion which is proportional to the angular displacement of said shaft, a plurality of adjacent parallel circumferential grooves formed in said sleeve between the intermediate portion thereof and the other end portion of said sleeve for permitting said axial movement and displacement of said intermediate portion, and means responsive to rectilinear displacement of said last-named portion for indicating the torque developed in said shaft.

2. A torquemeter as defined in claim 1, wherein said last-named means includes an armature fixed to the outer surface of said intermediate sleeve portion for axial movement therewith, axially fixed pole pieces, said armature being movable between said pole pieces, said armature and said pole pieces defining air gaps therebetween which are variable in length in response to movement of said armature with respect to said pole pieces, inductance coils mounted to provide a field of magnetic flux passing through said pole pieces and said armature and traversing said air gaps, the inductance of said coils varying in response to changes in the lengths of said air gaps, electrical means connected to said coils to indicate the variations in the inductance of said coils, and means for converting said inductance variations into a measurement proportional to the changes in lengths of said air gaps and to the rectilinear displacement of said armature and said intermediate sleeve portion, thereby providing a measure of the torque developed in said shaft.

3. A torquemeter which comprises a rotatable shaft having a neck portion, a sleeve axially fixed about the outer periphery of said shaft, the ends of said sleeve being connected to said shaft adjacent the neck portion thereof for rotation of said sleeve with said shaft, an intermediate portion of said sleeve being spaced from the neck portion of said shaft and being axially movable with respect to said shaft, a plurality of circumferential spaced slots formed in said sleeve between said intermediate portion and one end portion thereof, said slots forming a first flexible joint composed of a plurality of spring-like webs which are disposed at an angle to the axis of said sleeve, said webs each having a narrow flexible neck portion at both ends of the web and a stiffer intermediate portion, a plurality of grooves formed in said sleeve between said intermediate portion of said sleeve and the other end portion thereof, said grooves forming a second flexible joint in said sleeve, said first flexible joint urging said intermediate sleeve portion to move axially when said shaft is twisted due to a torque applied thereto, so as to convert the angular displacement of said shaft resulting from said torque into a rectilinear displacement of said last-named sleeve portion which is proportional to the angular displacement of said shaft, said second flexible joint allowing said axial movement and displacement of said intermediate portion, and electromagnetic means responsive to rectilinear displacement of said movable sleeve portion for indicating the torque developed in said shaft.

4. A torquemeter as defined in claim 3, wherein said last-named means includes an armature fixed to the outer surface of said intermediate sleeve portion for axial movement therewith, a pair of axially fixed pole pieces connected to the respective end portions of said sleeve for rotation with said end portions, said armature and said pole pieces defining a pair of air gaps therebetween which are variable in length in response to movement of said armature with respect to said pole pieces, a core having a pair of annular parallel recesses, said core being disposed adjacent and spaced from said pole pieces and said armature to form air gaps of fixed length therebetween, an inductance coil mounted in each of said annular recesses to provide a field of magnetic flux passing through said core, said pole pieces and said armature and traversing all of said air gaps, the inductance of said coils varying in response to changes in the lengths of said variable air gaps, electrical means connected to said coils to indicate the variations in the inductance thereof, and means for converting said inductance variations into measurement proportional to the changes in lengths of said variable air gaps and to the rectilinear displacement of said armature and said intermediate sleeve portion, thereby providing a measure of the torque developed in said shaft.

5. A torquemeter which comprises, a rotatable shaft, a sleeve axially connected at both ends to the outer periphery of said shaft for rotation therewith, an intermediate portion of said sleeve being spaced from and axially movable with respect to said shaft, a plurality of circumferential slots formed in said sleeve between said intermediate portion and one end portion thereof, said slots forming a first flexble joint composed of a plurality of spring-like webs which are disposed at an angle to the axis of said sleeve, a plurality of grooves formed in said sleeve between said intermediate portion of said sleeve and the other end portion thereof, said grooves forming a second flexible joint in said sleeve, said first flexible joint urging said intermediate sleeve portion to move axially when said shaft is twisted due to a torque applied thereto, so as to convert the angular displacement of said shaft resulting from said torque into a rectilinear displacement of said last-named sleeve portion which is proportional to the angular displacement of said shaft, said second flexible joint allowing said axial movement and displacement of said intermediate portion, and means responsive to rectilinear displacement of said movable sleeve portion for indicating the torque developed in said shaft.

References Cited in the file of this patent

UNITED STATES PATENTS

| | | |
|---|---|---|
| 2,260,036 | Kuehni | Oct. 21, 1941 |
| 2,432,900 | Jacobsen | Dec. 16, 1947 |